United States Patent
Sakayanagi et al.

(10) Patent No.: US 9,644,546 B2
(45) Date of Patent: May 9, 2017

(54) INTERNAL COMBUSTION ENGINE PROVIDED WITH VARIABLE COMPRESSION RATIO MECHANISM

(75) Inventors: Yoshihiro Sakayanagi, Mishima (JP); Takashi Kawasaki, Susono (JP); Hiroyuki Tanaka, Susono (JP); Takano Nakai, Numazu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 278 days.

(21) Appl. No.: 14/119,622

(22) PCT Filed: Nov. 8, 2011

(86) PCT No.: PCT/JP2011/075724
§ 371 (c)(1),
(2), (4) Date: Nov. 22, 2013

(87) PCT Pub. No.: WO2012/160724
PCT Pub. Date: Nov. 29, 2012

(65) Prior Publication Data
US 2015/0128911 A1    May 14, 2015

(30) Foreign Application Priority Data

May 23, 2011   (JP) ................................. 2011-114754

(51) Int. Cl.
*F02D 15/00* (2006.01)
*F02D 15/04* (2006.01)
(Continued)

(52) U.S. Cl.
CPC ......... *F02D 15/00* (2013.01); *F02D 13/0234* (2013.01); *F02D 15/04* (2013.01);
(Continued)

(58) Field of Classification Search
CPC .......... F02D 15/00; F02D 15/02; F02D 15/04; F02D 13/0234; G01M 15/08
See application file for complete search history.

(56) References Cited

U.S. PATENT DOCUMENTS

| 2004/0123818 A1 | 7/2004 | Sugiyama et al. |
| 2006/0070605 A1* | 4/2006 | Akihisa ............... F02D 13/0234 123/478 |
| 2007/0225892 A1 | 9/2007 | Yasui et al. |

FOREIGN PATENT DOCUMENTS

| JP | 2004-211598 A | 7/2004 |
| JP | 2005207273 A | 8/2005 |

(Continued)

*Primary Examiner* — Jacob Amick
(74) *Attorney, Agent, or Firm* — Andrews Kurth Kenyon LLP

(57) ABSTRACT

This internal combustion engine is provided with a variable compression ratio mechanism capable of changing a mechanical compression ratio by changing the volume of the combustion chamber at the top dead center. The pressure and temperature of remaining combusted gas within the combustion chamber at the time when the exhaust valve is closed in the intake stroke is measured or estimated, the pressure and temperature of intake air supplied into the combustion chamber after the exhaust valve is closed in the intake stroke is measured or estimated, and based on the assumption that the pressure and temperature of the remaining combusted gas which saturates the volume of the combustion chamber at the time when the exhaust valve is closed in the air intake stroke become, when the intake air is supplied to the combustion chamber, equal to the pressure and temperature of the intake air, the volume of the remaining combusted gas after the change is calculated.

2 Claims, 9 Drawing Sheets

(51) Int. Cl.
    *F02D 13/02*     (2006.01)
    *G01M 15/08*     (2006.01)
    *G01M 15/05*     (2006.01)

(52) U.S. Cl.
    CPC ............ *G01M 15/08* (2013.01); *G01M 15/05* (2013.01); *Y02T 10/18* (2013.01)

(56) References Cited

FOREIGN PATENT DOCUMENTS

| | | |
|---|---|---|
| JP | 2005-233038 A | 9/2005 |
| JP | 2005-315161 A | 11/2005 |
| JP | 2006-183604 A | 7/2006 |
| JP | 2007-040212 A | 2/2007 |
| JP | 2009-092052 A | 4/2009 |
| JP | 2010-265817 A | 11/2010 |

\* cited by examiner

Fig.6
(A)
MECHANICAL COMPRESSION RATIO=
COMBUSTION CHAMBER VOLUME+STROKE VOLUME/COMBUSTION CHAMBER VOLUME
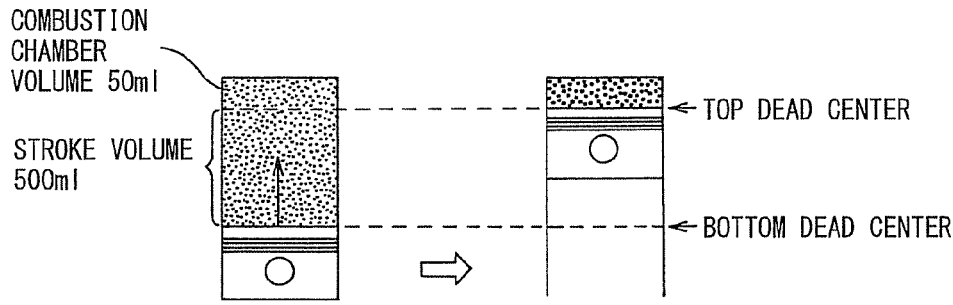
(B)
ACTUAL COMPRESSION RATIO=
COMBUSTION CHAMBER VOLUME+ACTUAL STROKE VOLUME/COMBUSTION CHAMBER VOLUME
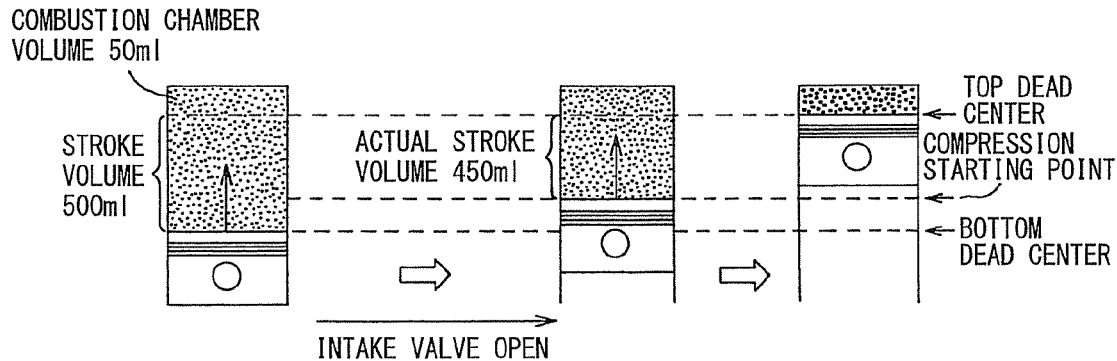
(C)
EXPANSION RATIO=
COMBUSTION CHAMBER VOLUME+STROKE VOLUME/COMBUSTION CHAMBER VOLUME
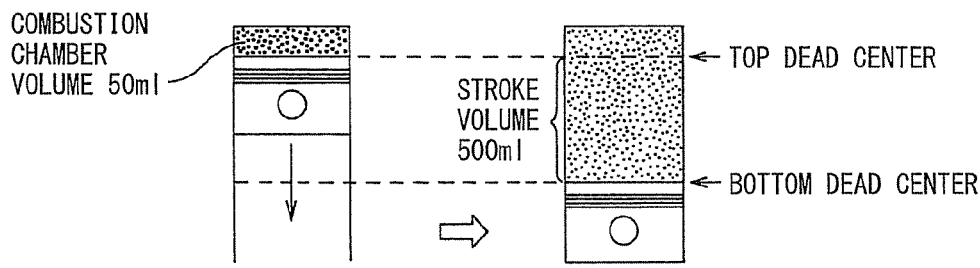

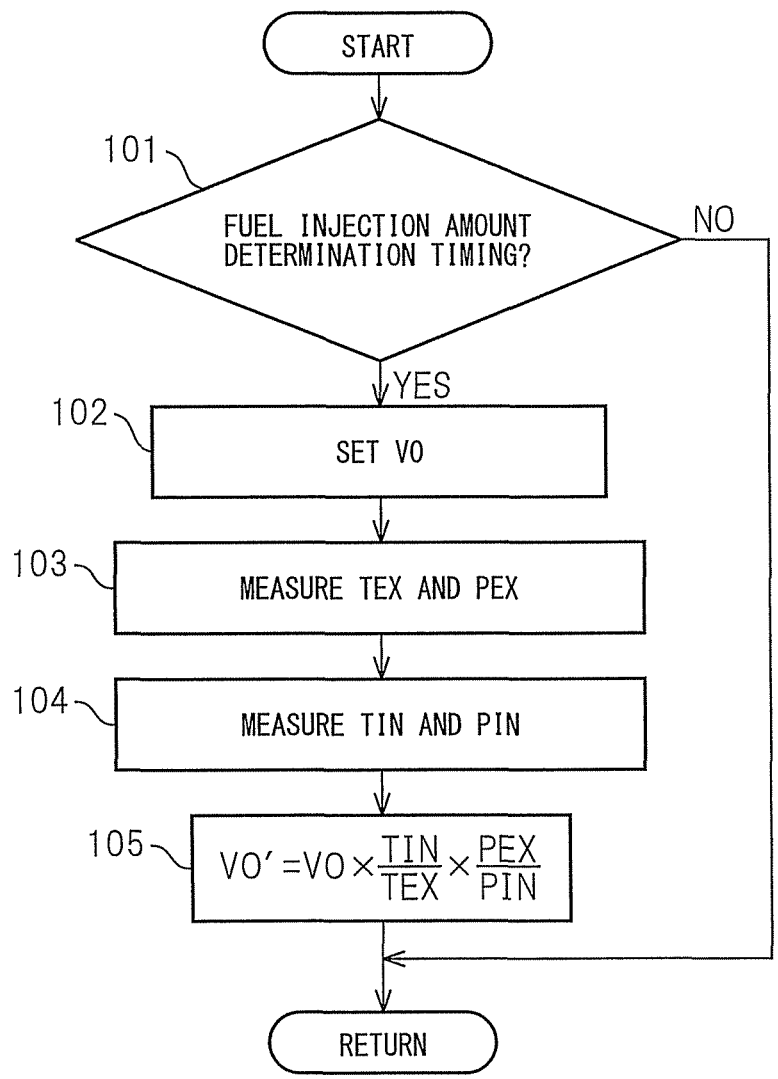

INTERNAL COMBUSTION ENGINE PROVIDED WITH VARIABLE COMPRESSION RATIO MECHANISM

CROSS REFERENCE TO RELATED APPLICATION

This is a national phase application based on the PCT International Patent Application No. PCT/JP2011/075724 filed on Nov. 8, 2011, claiming priority to Japanese application No. 2011-114754 filed May 23, 2011, the entire contents of both of which are incorporated herein by reference.

TECHNICAL FIELD

The present invention relates to an internal combustion engine which is provided with a variable compression ratio mechanism.

BACKGROUND ART

Known in the art is an internal combustion engine which is provided with a variable compression ratio mechanism which can change the combustion chamber volume at top dead center to change the mechanical compression ratio. In such an internal combustion engine, sometimes the amount of intake air is controlled by changing the closing timing of the intake valve in the compression stroke. In this case, it has been proposed to calculate the amount of intake air based on the closing timing of the intake valve and the intake air pressure (see PLT 1).

CITATIONS LIST

Patent Literature

PLT 1: Japanese Patent Publication No. 2006-183604A
PLT 2: Japanese Patent Publication No. 2005-315161A
PLT 3: Japanese Patent Publication No. 2005-233038A
PLT 4: Japanese Patent Publication No. 2004-211598A
PLT 5: Japanese Patent Publication No. 2007-040212A
PLT 6: Japanese Patent Publication No. 2010-265817A
PLT 7: Japanese Patent Publication No. 2009-092052A

SUMMARY OF INVENTION

Technical Problem

In the above-mentioned internal combustion engine provided with a variable compression ratio mechanism, the amount of change of the combustion chamber volume at top dead center when changing the mechanical compression ratio is assumed to be just the change in the amount of burned gas which remains in the combustion chamber and is assumed to have no effect on the amount of intake air. That is, it had been thought that the amount of intake air depended on the displacement and that even if changing the mechanical compression ratio, the displacement would not change, and therefore basically the amount of intake air would also not change. However, the volume of residual burned gas contracts due to the drop in temperature when mixing it with intake air which is fed into the combustion chamber and, further, expands due to a drop in pressure, and therefore has an effect on the amount of intake air.

Therefore, an object of the present invention is, in an internal combustion engine which is provided with a variable compression ratio mechanism which can change the combustion chamber volume at top dead center to change the mechanical compression ratio, to calculate the volume of the residual burned gas in the combustion chamber when intake air is fed into the combustion chamber so as to enable relatively accurate estimation of the amount of intake air.

Solution to Problem

An internal combustion engine which is provided with a variable compression ratio mechanism as set forth in claim 1 according to the present invention is an internal combustion engine which is provided with a variable compression ratio mechanism which can change the combustion chamber volume at top dead center to change the mechanical compression ratio, characterized by measuring or estimating the pressure and temperature of the residual burned gas in the combustion chamber when the exhaust valve is closed in the intake stroke, measuring or estimating the pressure and temperature of the intake air which is fed into the combustion chamber after the exhaust valve is closed in the intake stroke, and calculating the volume of the residual burned gas after change by assuming that the pressure and the temperature of the residual burned gas which fills the combustion chamber volume when the exhaust valve is closed in the intake stroke become equal to the pressure and temperature of the intake air when intake air is fed to the combustion chamber.

The internal combustion engine which is provided with a variable compression ratio mechanism as set forth in claim 2 of the present invention provides the internal combustion engine which is provided with a variable compression ratio mechanism as set forth in claim 1 characterized by calculating the volume of the intake air in the combustion chamber based on the calculated volume of residual burned gas, assuming that the intake air which is fed to the combustion chamber contains burned gas, and multiplying the calculated volume of the intake air with the new gas ratio to calculate the volume of the new gas.

Advantageous Effects of Invention

According to the internal combustion engine which is provided with a variable compression ratio mechanism as set forth in claim 1 according to the present invention, even when intake air is fed into the combustion chamber, the residual burned gas in the combustion chamber when the exhaust valve is closed in the intake stroke does not change in volume and does not occupy the combustion chamber volume when the exhaust valve is closed. Rather, the pressure and temperature of the residual burned gas become equal to the pressure and temperature of the intake air and thus the residual burned gas changes in volume and occupies the combustion chamber volume. Therefore, the volume of the residual burned gas after the change is calculated. Due to this, it is possible to deem that the volume in the combustion chamber occupied by the residual burned gas which changed in volume is not the feed of intake air and possible to estimate the amount of intake air relatively accurately.

According to the internal combustion engine which is provided with a variable compression ratio mechanism as set forth in claim 2 according to the present invention, there is provided the internal combustion engine which is provided with a variable compression ratio mechanism as set forth in claim 1 which calculate the volume of the intake air in the combustion chamber based on the calculated volume of residual burned gas, assumes that the intake air which is fed to the combustion chamber contains burned gas, and multiplies the calculated volume of the intake air with the new gas ratio to calculate the volume of the new gas. Due to this, it is possible to more accurately estimate the amount of new gas in the combustion chamber which is required for calculation of the accurate combustion air-fuel ratio.

BRIEF DESCRIPTION OF DRAWINGS

FIG. 6 are views for explaining a mechanical compression ratio, an actual compression ratio, and an expansion ratio.

FIG. 10 is a flow chart for calculating a change in volume of residual burned gas in a combustion chamber.

DESCRIPTION OF EMBODIMENTS

Figure 1:
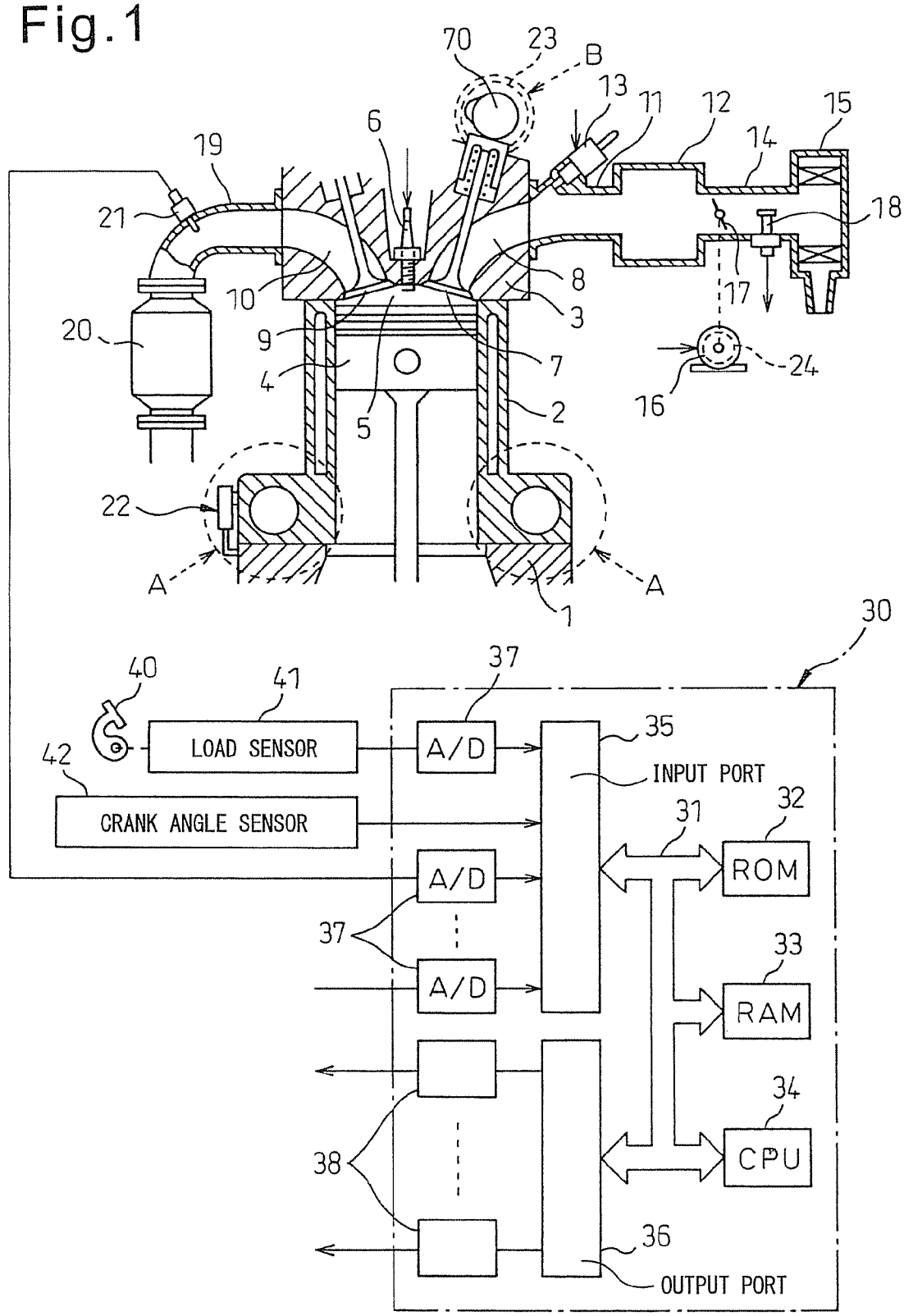
FIG. 1 is an overview of an internal combustion engine.

FIG. 1 shows a side cross-sectional view of an internal combustion engine which is provided with a variable compression ratio mechanism according to the present invention. Referring to FIG. 1, 1 indicates a crankcase, 2 a cylinder block, 3 a cylinder head, 4 a piston, 5 a combustion chamber, 6 a spark plug arranged at the top center of a combustion chamber 5, 7 an intake valve, 8 an intake port, 9 an exhaust valve, and 10 an exhaust port. Each intake port 8 is connected through an intake branch tube 11 to a surge tank 12, while each intake branch tube 11 is provided with a fuel injector 13 for injecting fuel toward a corresponding intake port 8.

Note that each fuel injector 13 may be arranged at each combustion chamber 5 instead of being attached to each intake branch tube 11.

The surge tank 12 is connected through an intake duct 14 to an air cleaner 15, while the intake duct 14 is provided inside it with a throttle valve 17 which is driven by an actuator 16 and an intake air amount detector 18 which uses for example a hot wire. On the other hand, the exhaust port 10 is connected through an exhaust manifold 19 to a catalytic device 20 which houses for example a three-way catalyst, while the exhaust manifold 19 is provided inside it with an air-fuel ratio sensor 21. When the combustion air-fuel ratio is the stoichiometric air-fuel ratio, the catalyst device 20 preferably has a built-in three-way catalyst as explained above, but when the combustion air-fuel ratio is sometimes made leaner than the stoichiometric air-fuel ratio, it is preferable to house an $NO_X$ storage and reduction catalyst in the catalyst device 20 or to arrange another catalyst device which houses an $NO_X$ storage and reduction catalyst at the downstream side of the catalyst device 20 which houses the three-way catalyst.

On the other hand, in the embodiment shown in FIG. 1, the connecting part of the crankcase 1 and the cylinder block 2 is provided with a variable compression ratio mechanism A which is able to change the relative positions of the crankcase 1 and cylinder block 2 in the cylinder axial direction so as to change the volume of the combustion chamber 5 when the piston 4 is positioned at compression top dead center and is further provided with an actual compression action start timing changing mechanism B which is able to change a start timing of an actual compression action. Note that in the embodiment shown in FIG. 1, this actual compression action start timing changing mechanism B is comprised of a variable valve timing mechanism which is able to control the closing timing of the intake valve 7.

As shown in FIG. 1, the crankcase 1 and the cylinder block 2 have a relative position sensor 22 attached to them to detect the relative positional relationship between the crankcase 1 and the cylinder block 2. From the relative position sensor 22, an output signal which shows the change in the interval between the crankcase 1 and the cylinder block 2 is output. Further, the variable valve timing mechanism B has a valve timing sensor 23 attached to it so as to generate an output signal which shows the closing timing of the intake valve 7, while the actuator 16 for driving the throttle valve has a throttle opening degree sensor 24 attached to it so as to generate an output signal which shows the throttle valve opening degree.

The electronic control unit 30 is comprised of a digital computer which is provided with components connected with each other through a bidirectional bus 31 such as a ROM (read only memory) 32, RAM (random access memory) 33, CPU (microprocessor) 34, input port 35, and output port 36. The output signals of the intake air amount detector 18, the air-fuel ratio sensor 21, the relative position sensor 22, the valve timing sensor 23, and the throttle opening degree sensor 24 are input through corresponding AD converters 37 to the input port 35. Further, the accelerator pedal 40 is connected to a load sensor 41 which generates an output voltage proportional to the amount of depression L of the accelerator pedal 40. The output voltage of the load sensor 41 is input through a corresponding AD converter 37 to the input port 35. Further, the input port 35 is connected to a crank angle sensor 42 which generates an output pulse every time the crankshaft rotates by for example 30°. On the other hand, the output port 36 is connected through a corresponding drive circuit 38 to spark plugs 6, fuel injectors 13, throttle valve drive actuator 16, variable compression ratio mechanism A, and variable valve timing mechanism B.

Figure 2:
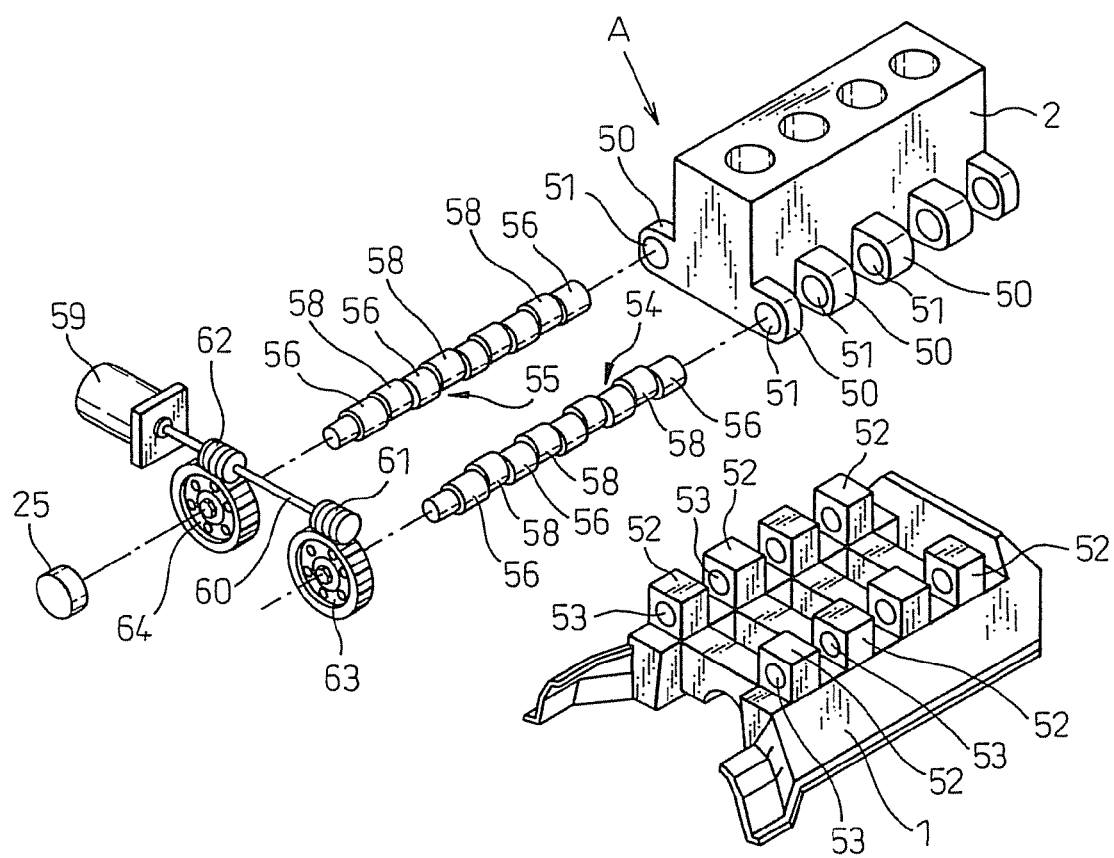
FIG. 2 is a disassembled perspective view of a variable compression ratio mechanism.
Figure 3:
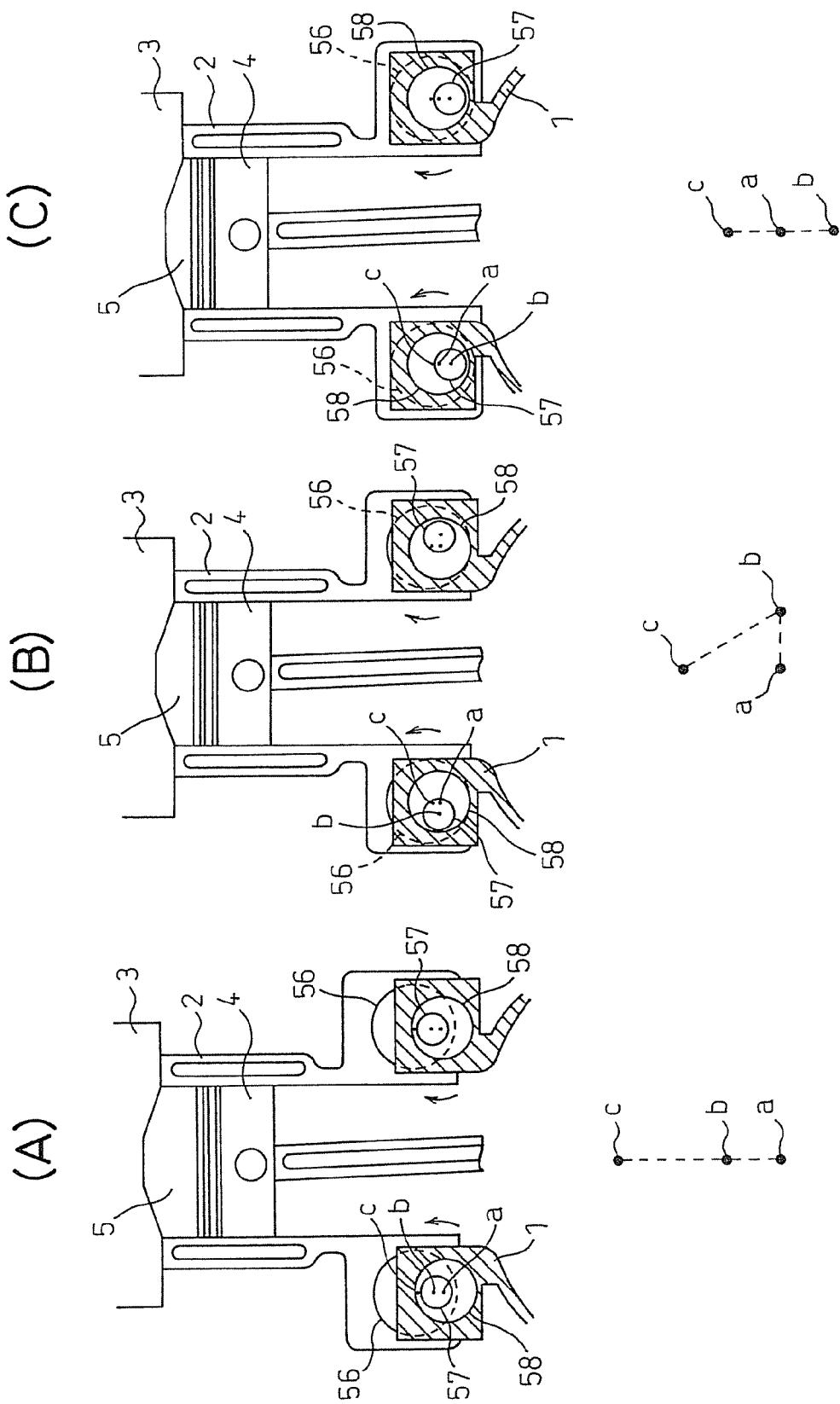
FIG. 3 is a side cross-sectional view of an internal combustion engine which is shown schematically.

FIG. 2 is a disassembled perspective view of the variable compression ratio mechanism A which is shown in FIG. 1, while FIG. 3 is a side cross-sectional view of the illustrated internal combustion engine. Referring to FIG. 2, at the bottom of the both side walls of the cylinder block 2, a plurality of projecting parts 50 which are separated from each other by a certain distance are formed. Each projecting part 50 is formed with a circular cross-section cam insertion hole 51. On the other hand, the top surface of the crankcase 1 is formed with a plurality of projecting parts 52 which are separated from each other by a certain distance and which fit between the corresponding projecting parts 50. These projecting parts 52 are also formed with circular cross-section cam insertion holes 53.

As shown in FIG. 2, a pair of cam shafts 54 and 55 are provided. On each of the cam shafts 54 and 55, circular cams 58 inserted into the cam insertion holes 53 so as to be able to rotate in the cam insertion holes 53 are fixed at every other position. These circular cams 58 are coaxial with the rotation axes of the cam shafts 54 and 55. On the other hand, at the two sides of each circular cam 58, as shown in FIG. 3, extend eccentric shafts 57 arranged eccentrically with respect to the rotation axes of the cam shafts 54 and 55. Each eccentric shaft 57 has other circular cams 56 rotatably attached to it eccentrically. As shown in FIG. 2, these circular cams 56 are arranged at the two sides of circular cams 58. These circular cams 56 are rotatably inserted in the corresponding cam insertion holes 51. Further, as shown in FIG. 2, the cam shaft 55 has a cam rotational angle sensor 25 attached to it so as to generate an output signal which shows the rotational angle of the cam shaft 55.

When the circular cams 58 which are fastened to the cam shafts 54, 55 are rotated in opposite directions as shown by the arrows in FIG. 3(A) from the state shown in FIG. 3(A), the eccentric shafts 57 move in directions separating from each other, and therefore the circular cams 56 rotate in the opposite directions from the circular cams 58 in the cam insertion holes 51. As shown in FIG. 3(B), the positions of the eccentric shafts 57 change from a high position to a medium position. Next, if making the circular cams 58 rotate further in the direction shown by the arrow, as shown in FIG. 3(C), the eccentric shafts 57 become the lowest position.

Note that, FIG. 3(A), FIG. 3(B), and FIG. 3(C) show the positional relationship of the centers "a" of the circular cams 58, the centers "b" of the eccentric shafts 57, and the centers, "c" of the circular cams 56 in the respective states.

As will be understood from a comparison of FIG. 3(A) and FIG. 3(C), the relative positions of the crankcase 1 and cylinder block 2 are determined by the distance between the centers "a" of the circular cams 58 and the centers "c" of the circular cams 56. The larger the distance between the centers "a" of the circular cams 58 and the centers "c" of the circular cams 56, the further the cylinder block 2 from the crankcase 1. That is, the variable compression ratio mechanism A uses a crank mechanism using rotating cams so as to change the relative positions between the crankcase 1 and the cylinder block 2. If the cylinder block 2 separates from the crankcase 1, the volume of a combustion chamber 5 when the piston 4 is positioned at compression top dead center increases, therefore by making the cam shafts 54 and 55 rotate, the volume of a combustion chamber 5 when the piston 4 is positioned at compression top dead center can be changed.

As shown in FIG. 2, to make the cam shafts 54 and 55 rotate in opposite directions, the shaft of a drive motor 59 is provided with a pair of worm gears 61 and 62 with opposite thread directions. Worm wheels 63 and 64 engaging with these worm gears 61 and 62 are fastened to ends of the cam shafts 54 and 55. In this embodiment, the drive motor 59 may be driven to change the volume of the combustion chamber 5 when the piston 4 is positioned at compression top dead center, over a broad range.

Figure 4:
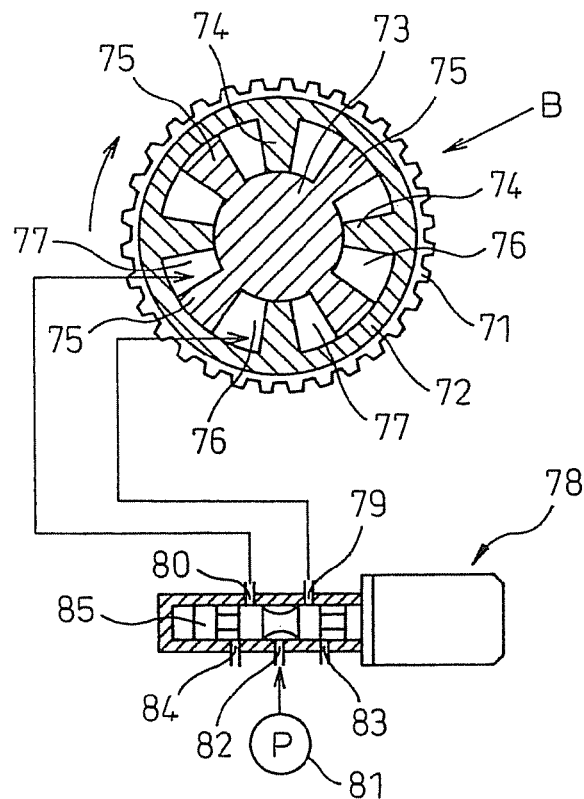
FIG. 4 is a view which shows a variable valve timing mechanism.

On the other hand, FIG. 4 shows a variable valve timing mechanism B which is attached to the end of a cam shaft 70 for driving the intake valve 7 in FIG. 1. Referring to FIG. 4, this variable valve timing mechanism B is provided with a timing pulley 71 which is rotated by an engine crankshaft through a timing belt in the arrow direction, a cylindrical housing 72 which rotates together with the timing pulley 71, a shaft 73 which is able to rotate together with an intake valve drive cam shaft 70 and to rotate relative to the cylindrical housing 72, a plurality of partitions 74 which extend from an inside circumference of the cylindrical housing 72 to an outside circumference of the shaft 73, and vanes 75 which extend between the partitions 74 from the outside circumference of the shaft 73 to the inside circumference of the cylindrical housing 72, the two sides of the vanes 75 formed with advancing hydraulic chambers 76 and retarding hydraulic chambers 77.

The feed of working oil to the hydraulic chambers 76 and 77 is controlled by a working oil feed control valve 78. This working oil feed control valve 78 is provided with hydraulic ports 79 and 80 which are connected to the hydraulic chambers 76 and 77, a feed port 82 for working oil which is discharged from a hydraulic pump 81, a pair of drain ports 83 and 84, and a spool valve 85 for controlling connection and disconnection of the ports 79, 80, 82, 83, and 84.

To advance the phase of the cams of the intake valve drive cam shaft 70, in FIG. 4, the spool valve 85 is moved to the right, working oil which is fed from the feed port 82 is fed through the hydraulic port 79 to the advancing hydraulic chambers 76, and working oil in the retarding hydraulic chambers 77 is drained from the drain port 84. At this time, the shaft 73 is rotated relative to the cylindrical housing 72 in the arrow direction.

As opposed to this, to retard the phase of the cams of the intake valve drive cam shaft 70, in FIG. 4, the spool valve 85 is moved to the left, working oil fed from the feed port 82 is fed through the hydraulic port 80 to the retarding hydraulic chambers 77, and working oil in the advancing hydraulic chambers 76 is drained from the drain port 83. At this time, the shaft 73 is rotated relative to the cylindrical housing 72 in the direction opposite to the arrows.

When the shaft 73 is rotated relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
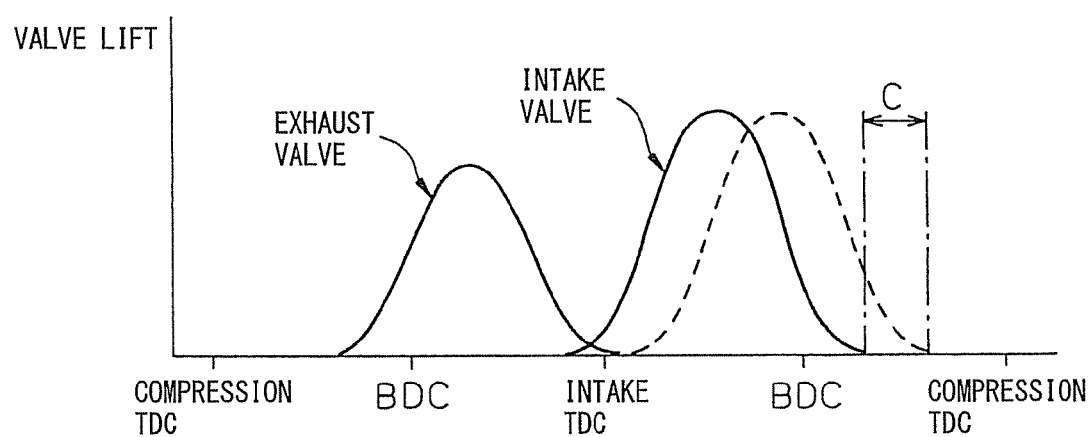
FIG. 5 is a view which shows amounts of lift of an intake valve and exhaust valve.

In FIG. 5, the solid line shows when the phase of the cams of the intake valve drive cam shaft 70 is advanced the most by the variable valve timing mechanism B, while the broken line shows when the phase of the cams of the intake valve drive cam shaft 70 is retarded the most by the variable valve timing mechanism B. Therefore, the opening period of the intake valve 7 can be freely set between the range which is shown by the solid line in FIG. 5 and the range which is shown by the broken line, therefore the closing timing of the intake valve 7 can be set to any crank angle in the range which is shown by the arrow C in FIG. 5.

The variable valve timing mechanism B which is shown in FIG. 1 and FIG. 4 is one example. For example, a variable valve timing mechanism which are able to change only the closing timing of the intake valve while maintaining the opening timing of the intake valve constant, or other various types of variable valve timing mechanisms, can be used.

Next, the meaning of the terms used in the present application will be explained with reference to FIG. 6. Note that FIGS. 6(A), (B), and (C) show for explanatory purposes an engine with a volume of the combustion chambers of 50 ml and a stroke volume of the piston of 500 ml. In these FIGS. 6(A), (B), and (C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual combustion ratio. This actual combustion ratio is a value determined from the actual stroke volume of the piston from when the compression action is actually started to when the piston reaches top dead center, and the combustion chamber volume. This actual combustion ratio is expressed by (combustion chamber volume+actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual combustion ratio is expressed as above using the actual stroke volume. In the example shown in FIG. 6(B), the actual combustion ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, the superhigh expansion ratio cycle which is used in the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle which are used selectively in accordance with the load in the present invention.

FIG. 8(A) shows the ordinary cycle when the intake valve closes near the bottom dead center and the compression action by the piston is started from near substantially intake bottom dead center. In the example shown in this FIG. 8(A) as well, in the same way as the examples shown in FIGS. 6(A), (B), and (C), the combustion chamber volume is 50 ml, and the stroke volume of the piston is 500 ml. As will be understood from FIG. 8(A), in an ordinary cycle, the mechanical compression ratio is (50 ml+500 ml)/50 ml=11, the actual combustion ratio is also about 11, and the expansion ratio also becomes (50 ml+500 ml)/50 ml=11. That is, in an ordinary internal combustion engine, the mechanical compression ratio and actual combustion ratio and the expansion ratio become substantially equal.

Figure 7:
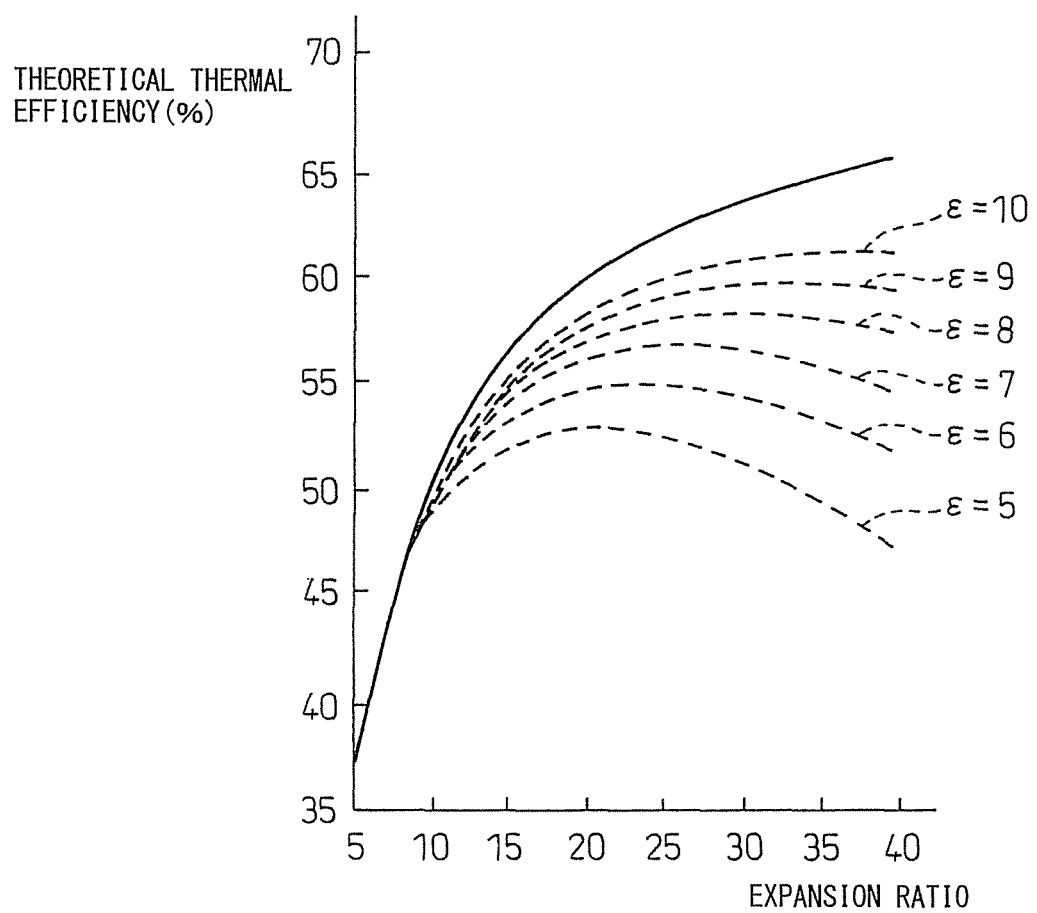
FIG. 7 is a view which shows a relationship between a theoretical thermal efficiency and expansion ratio.
Figure 8:
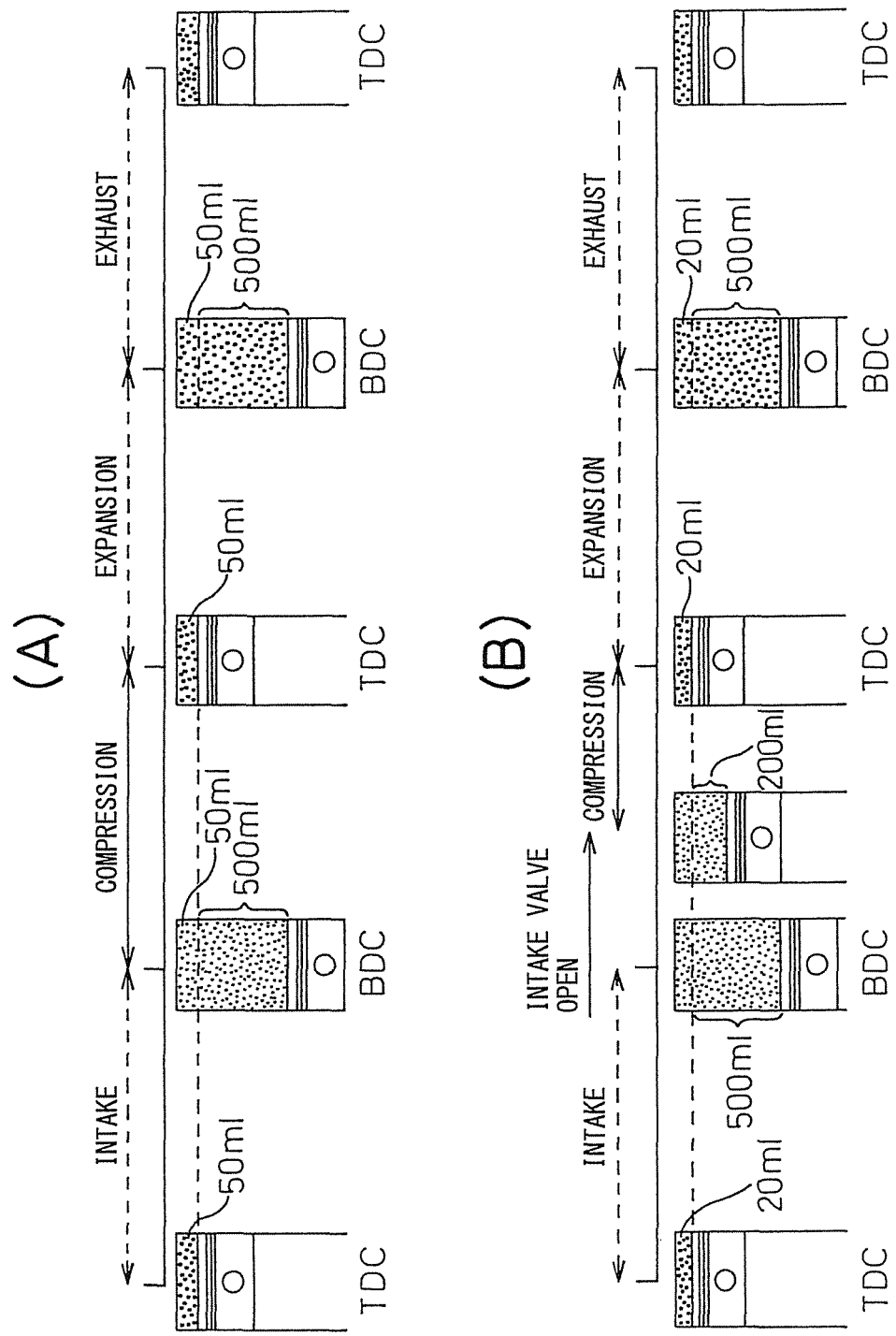
FIG. 8 are views for explaining an ordinary cycle and superhigh expansion ratio cycle.

The solid line in FIG. 7 shows the change in the theoretical thermal efficiency in the case where the actual combustion ratio and expansion ratio are substantially equal, that is, in the ordinary cycle. In this case, it is learned that the larger the expansion ratio, that is, the higher the actual combustion ratio, the higher the theoretical thermal efficiency. Therefore, in an ordinary cycle, to raise the theoretical thermal efficiency, the actual combustion ratio should be made higher. However, due to the restrictions on the occurrence of knocking at the time of engine high load operation, the actual combustion ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual combustion ratio and studied raising the theoretical thermal efficiency and as a result discovered that in the theoretical thermal efficiency, the expansion ratio is dominant, and the theoretical thermal efficiency is not affected much at all by the actual combustion ratio. That is, if raising the actual combustion ratio, the explosive force rises, but compression requires a large energy, accordingly even if raising the actual combustion ratio, the theoretical thermal efficiency will not rise much at all.

As opposed to this, if increasing the expansion ratio, the longer the period during which a force acts pressing down the piston at the time of the expansion stroke, and thus the longer the time that the piston gives a rotational force to the crankshaft. Therefore, the larger the expansion ratio is made, the higher the theoretical thermal efficiency becomes. The broken line $\epsilon=10$ in FIG. 7 shows the theoretical thermal efficiency in the case of fixing the actual combustion ratio at 10 and raising the expansion ratio in that state. In this way, it is learned that the amount of rise of the theoretical thermal efficiency when raising the expansion ratio $\epsilon$ in the state where the actual combustion ratio is maintained at a low value and the amount of rise of the theoretical thermal efficiency in the case where the actual combustion ratio is increased along with the expansion ratio as shown by the solid line of FIG. 7 will not differ that much.

If the actual combustion ratio is maintained at a low value in this way, knocking will not occur, therefore if raising the expansion ratio in the state where the actual combustion ratio is maintained at a low value, the occurrence of knocking can be prevented and the theoretical thermal efficiency can be greatly raised. FIG. 8(B) shows an example of the case when using the variable compression ratio mechanism A and the variable valve timing mechanism B to maintain the actual combustion ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to retard the closing timing of the intake valve until the actual stroke volume of the piston changes from 500 ml to 200 ml. As a result, in this example, the actual combustion ratio becomes (20 ml+200 ml)/20 ml=11 and the expansion ratio becomes (20 ml+500 ml)/20 ml=26. In the ordinary cycle shown in FIG. 8(A), as explained above, the actual combustion ratio is about 11 and the expansion ratio is 11. Compared with this case, in the case shown in FIG. 8(B), it is learned that only the expansion ratio is raised to 26. This will be called the "superhigh expansion ratio cycle" below.

Generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8(B), the actual stroke volume of the piston at the time of the compression stroke is becomes smaller, and therefore the amount of intake air which can be sucked into the combustion chamber 5 becomes smaller. Accordingly, this superhigh expansion ratio cycle can only be employed when the engine load is relatively low. Therefore, in this embodiment of the present invention, when the engine low load is relatively low, the superhigh expansion ratio cycle which is shown in FIG. 8(B) is set, while at the time of engine high load operation, the ordinary cycle which is shown in FIG. 8(A) is set.

Figure 9:
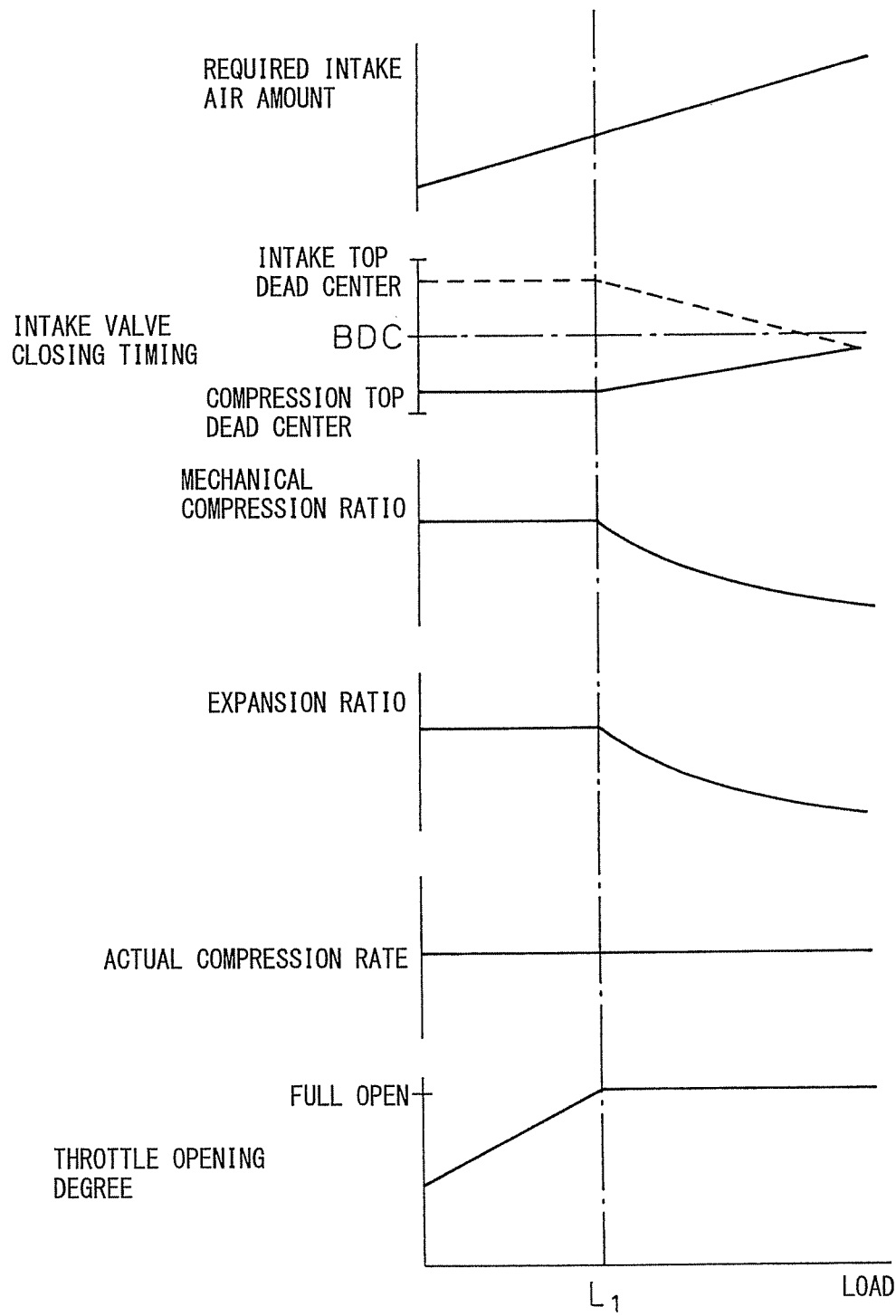
FIG. 9 is a view which shows changes in the mechanical compression ratio etc. depending on the engine load.

Next, referring to FIG. 9, the overall operational control will be briefly explained. FIG. 9 shows the changes, depending on the engine load, in the amount of intake air, the closing timing of the intake valve, the mechanical compression ratio, the expansion ratio, the actual compression ratio, and the opening degree of the throttle valve 17 at a certain engine speed. Note that FIG. 9 shows the case where the average air-fuel ratio in the combustion chamber 5 is feedback controlled to the stoichiometric air-fuel ratio based on the output signal of the air-fuel ratio sensor 21 so that the three-way catalyst in the catalytic device 20 can simultaneously reduce the unburned HC, CO, and $NO_X$ in the exhaust gas.

Now, as explained above, at the time of engine high load operation, the ordinary cycle shown in FIG. 8(A) is executed. Therefore, as shown in FIG. 9, at this time, since the mechanical compression ratio is low, the expansion ratio becomes low. As shown by the solid line in FIG. 9, the closing timing of the intake valve 7 is advanced as shown by the solid line in FIG. 5. Further, at this time, the amount of intake air is large. At this time, the opening degree of the throttle valve 17 is maintained full open, and therefore the pumping loss becomes zero.

On the other hand, as shown by the solid line in FIG. 9, if the engine load becomes low, along with this the closing timing of the intake valve 7 is retarded so as to reduce the amount of intake air. Further, at this time, the mechanical compression ratio is increased as the engine load becomes lower as shown in FIG. 9 so that the actual compression ratio is held substantially constant. Therefore, the expansion ratio is also increased as the engine load becomes lower. Note that at this time as well, the throttle valve 17 is held at the full open state. Therefore the amount of intake air fed to the combustion chamber 5 is controlled not by the throttle valve 17, but by changing the closing timing of the intake valve, 7.

In this way, when the engine load becomes lower than the engine high load operating state, the mechanical compression ratio is increased along with the reduction of the amount of intake air in the state where the actual compression ratio is substantially constant. That is, the volume of the combustion chamber 5 when the piston 4 reaches compression top dead center is decreased proportionally to the decrease in the amount of intake air. Therefore, the volume of the combustion chamber 5 when the piston 4 reaches compression top dead center changes in proportion to the amount of intake air. Note that, at this time, in the example which is shown in FIG. 9, the air-fuel ratio in the combustion chamber 5 becomes the stoichiometric air-fuel ratio, and therefore the volume of the combustion chamber 5 when the piston 4 reaches compression top dead center changes in proportion to the amount of fuel.

If the engine load becomes further lower, the mechanical compression ratio is further increased. If the engine load falls to the medium load L1 somewhat near low load, the mechanical compression ratio reaches the limit mechanical compression ratio corresponding to the structural limit of the combustion chamber 5 (upper limit mechanical compression ratio). If the mechanical compression ratio reaches the limit mechanical compression ratio, in the region of a lower load than the engine load L1 when the mechanical compression ratio reaches the limit mechanical compression ratio, the mechanical compression ratio is held at the limit mechanical compression ratio. Therefore, at the time of low load side engine medium load operation and at the time of engine low load operation, that is, at the engine low load operation side, the mechanical compression ratio becomes maximum and the expansion ratio also becomes maximum. Explained another way, at the engine low load operation side, the mechanical compression ratio becomes maximum so that the maximum expansion ratio is obtained.

On the other hand, in the embodiment which is shown in FIG. 9, if the engine load falls down to L1, the closing timing of the intake valve 7 becomes the limit closing timing at which the amount of intake air which is supplied to the combustion chamber 5 can be controlled. If the closing timing of the intake valve 7 reaches the limit closing timing, in the region of a lower load than the engine load L1 when the closing timing of the intake valve 7 reaches the limit closing timing, the closing timing of the intake valve 7 is held at the limit closing timing.

If the closing timing of the intake valve 7 is held at the limit closing timing, change of the closing timing of the intake valve 7 can no longer be used to control the amount of intake air. In the embodiment which is shown in FIG. 9, at that time, that is, in the region of a lower load than the load when the closing timing of the intake valve 7 reaches the limit closing timing, the throttle valve 17 is used to control the amount of intake air which is supplied to the inside of a combustion chamber 5. The opening degree of the throttle valve 17 is made smaller the lower the engine load.

On the other hand, as shown in FIG. 9 by the broken line, as the engine load becomes lower, the amount of the intake air can be controlled without relying on the throttle valve 17 by advancing the closing timing of the intake valve 7. Therefore, if expressing this so as to be able to encompass both the case shown in FIG. 9 by the solid line and the case shown by the broken line, in the embodiment according to the present invention, the closing timing of the intake valve 7 can be made to move in a direction away from intake bottom dead center BDC as the engine load becomes lower until the limit closing timing L1 at which the amount of intake air which is fed into the combustion chamber can be controlled. In this way, the amount of intake air can be controlled even if changing the closing timing of the intake valve 7 as shown in FIG. 9 by the solid line and can be controlled even if changing it as shown by the broken line.

As explained above, in the superhigh expansion ratio cycle which is shown in FIG. 8(B), the expansion ratio is 26. The higher this expansion ratio, the better, but as will be understood from FIG. 7, even if 20 or more with respect to the practically usable lower limit actual compression ratio $\epsilon=5$, a considerably high theoretical thermal efficiency can be obtained. Therefore, in this embodiment, the variable compression ratio mechanism A is formed so that the expansion ratio becomes 20 or more.

In this regard, when determining the fuel injection amount, in order to realize the desired combustion air-fuel ratio, it is necessary to grasp the amount of intake air (weight) which is fed into the combustion chamber. The amount of intake air can be calculated based on the volume occupied by the intake air in the combustion chamber and the pressure and temperature of the intake air.

The volume occupied by the intake air in the combustion chamber becomes one other than volume occupied by the burned gas in the combustion chamber. To learn the volume occupied by the intake air in the combustion chamber, it is sufficient to calculate the volume of the burned gas occupied in the combustion chamber. FIG. 10 is a flow chart for that. The routine is executed by the electronic control unit 30.

First, at step 101, it is judged if it is the timing for determination of the fuel injection amount. For example, when the fuel injector 13 is arranged at the intake port 8, the fuel injection is performed in the intake stroke. Further, when the fuel injector is arranged at the combustion chamber, the fuel injection is possible from the start of the intake stroke to the ignition timing of the compression stroke, but for vaporization and mixing of the fuel injection, it is preferable to end the fuel injection during the intake stroke. Whatever the case, it is necessary to determine the fuel injection amount before the fuel injection ends.

When the judgment at step 101 is NO, it is not necessary to calculate the volume of the burned gas occupied in the combustion chamber to determine the fuel injection amount, and thus the routine is ended without doing anything. However, if at the timing for determination of the fuel injection amount, the judgment at step 101 is YES and, at step 102, the combustion chamber volume V0 at the time of exhaust valve closing is set. The combustion chamber volume V0 at the time of exhaust valve closing changes not only due to the dimensions and shape of the combustion chamber, but also the current mechanical compression ratio and current closing timing of the exhaust valve. The smaller the variable compression ratio mechanism A makes the mechanical compression ratio, the larger the combustion chamber volume at top dead center, and therefore the combustion chamber volume V0 at the time of exhaust valve closing becomes larger. Further, the more retarded the closing timing of the exhaust valve, the larger the combustion chamber volume V0 at the time of exhaust valve closing. The current mechanical compression ratio can be estimated based on the output of the relative position sensor 22.

At the intake stroke, even if the intake valve opens and the piston descends from intake top dead center (exhaust top dead center), while the exhaust valve is open, the exhaust pressure of the exhaust port 10 is higher than the intake pressure of the intake port 8, and therefore intake air will never be fed into the combustion chamber. Due to this, the combustion chamber volume V0 at the time of exhaust valve closing is filled with burned gas.

Next, at step 103, when the exhaust valve is closed, the temperature TEX and pressure PEX of the burned gas which fills the combustion chamber volume V0 are measured by the temperature sensor and pressure sensor (both not shown) which are arranged in the combustion chamber.

Preferably, at the same time as step 103, at step 104, the temperature TIN and pressure PIN of the intake air which is fed to the combustion chamber are measured by for example a temperature sensor and pressure sensor (both not shown) which are arranged in a surge tank 12.

The pressure PEX and temperature TEX of the burned gas in the combustion chamber when the exhaust valve is closed in the intake stroke become equal to the pressure PIN and temperature TIN of the intake air if intake air were fed to the combustion chamber and the burned gas changes in volume to occupy the combustion chamber. At step 105, the thus changing volume V0' of the burned gas is calculated by the following formula:

$$V0'=V0*TIN/TEX*PEX/PIN$$

In this way, if, at the timing for determination of the fuel injection amount, the volume V0' occupied after change of volume of the burned gas remaining in the combustion chamber right after closing of the exhaust valve in the intake stroke is calculated, the amount of intake air can be calculated. For example, when the closing timing of the intake valve is controlled, as shown in FIG. 9 by the broken line, before intake bottom dead center, the volume (V1'–V0') of the combustion chamber volume V1' until closing of the intake valve (total of combustion chamber volume at top dead center based on current mechanical compression ratio and stroke volume of piston from top dead center to closing of intake valve) minus the volume V0' occupied by the burned gas becomes the volume occupied by the intake air, and therefore the amount of intake air can be calculated based on the pressure PIN and temperature TIN and of the intake air.

Further, when the closing timing of the intake valve is controlled, as shown in FIG. 9 by the solid line, after intake bottom dead center, for example, the volume (V1"–V0') of the combustion chamber volume V1" from closing of the intake valve (total of combustion chamber volume at top dead center based on current mechanical compression ratio and stroke volume of piston from closing of intake valve to top dead center) minus the volume V0' occupied by the burned gas becomes the volume occupied by the intake air, and therefore the amount of intake air can be calculated based on the pressure PIN and temperature TIN of the intake air.

Further, in the interval from intake bottom dead center to when the intake valve is closed, it may be considered that not only intake air, but also burned gas will be exhausted to the intake system. In this case, first, the volume occupied by the intake air at intake bottom dead center is calculated by subtracting from the combustion chamber volume V1 at intake bottom dead center (total of combustion chamber volume at top dead center based on current mechanical compression ratio and stroke volume of piston) the volume V0' occupied by the burned gas (V1–V0'). Next, by multiplying the volume occupied by the intake air at intake bottom dead center (V1–V0') with the ratio V1"/V1 between combustion chamber volume V1" from closing of the intake valve to the combustion chamber volume V1 at intake bottom dead center, it is possible to calculate the volume occupied by the intake air and possible to calculate the amount of intake air based on the pressure PIN and temperature TIN of the intake air.

At step 103 of the flow chart of FIG. 10, the burned gas temperature TEX and pressure PEX in the combustion chamber when the intake valve was closed were measured by arranging a temperature sensor and pressure sensor in the combustion chamber, but it is also possible to map them for each engine operating state determined by the engine load and engine speed. Further, even if only a pressure sensor is arranged in the combustion chamber, by using the pressure sensor to monitor the cylinder internal pressure P in the expansion stroke and specifying the crank angle CA at which the product PV of the cylinder internal pressure P and the combustion chamber volume V become the maximum value PVM, it is possible to estimate that the larger the maximum value PVM, the higher the burned gas temperature TEX will become. Further, it is possible to estimate that the more the crank angle CA is retarded, the smaller the expansion work after that and the higher the burned gas temperature TEX will become. The burned gas temperature TEX can be mapped with respect to the maximum value PVM and the crank angle CA.

The intake temperature TIN which is measured at step 104 of the flow chart of FIG. 10 may also be the atmospheric temperature. Further, when the throttle valve is full open, the intake pressure PIN may be the atmospheric pressure. At the time of control of the opening degree of the throttle valve, the intake pressure PIN can be mapped with respect to the opening degree of the throttle valve so as to become lower the smaller the opening degree of the throttle valve (to become larger as an absolute value of the negative pressure).

Further, if the intake valve opens during the exhaust stroke, from when the intake valve opens to exhaust top dead center, the burned gas in the combustion chamber flows out to not only the exhaust port 10, but also the intake port 8. Due to this, strictly speaking, the intake air in the intake port 8 which is fed into the combustion chamber from when the exhaust valve closes includes burned gas.

Therefore, the volume occupied by the intake air (V1'–V0'), (V1"–V0'), or (V1–V0')·V"/V1 calculated as explained above, may be multiplied with the new gas ratio R of the gas which is sucked into the combustion chamber from the intake port 8 so as to calculate the volume occupied by the new gas for estimating the amount of new gas which is required for calculating an accurate combustion air-fuel ratio.

Here, the new gas ratio R is the ratio fv/gv of the new gas volume fv to the unit volume gv of gas which is sucked from the intake port 9 into the combustion chamber, while the unit volume gv is the sum of the new gas volume fv and burned gas volume ev which are contained in the unit volume gv.

The more the opening timing of the intake valve in the exhaust stroke is advanced, the greater the amount of burned gas which flows out to the intake port 8 and the larger the burned gas volume ev to the unit volume gv of gas which is sucked from the intake port 9 into the combustion chamber and the smaller the new gas ratio R. Further, the higher the engine load and the higher the combustion pressure, the higher the pressure of the burned gas in the cylinder when the intake valve is opened, and therefore the greater the amount of burned gas which flows out to the intake port 8 and the smaller the new gas ratio R. In this way, it is possible to use the engine operating state (engine load and engine speed) and the opening timing of the intake valve as the basis to map the new gas ratio R.

REFERENCE SIGNS LIST

1 crankcase
2 cylinder block
A variable compression ratio mechanism
B variable valve timing mechanism

The invention claimed is:
1. An internal combustion engine comprising:
    a variable compression ratio mechanism which can change the combustion chamber volume at top dead center to change the mechanical compression ratio; and
    a control unit, wherein
    the control unit is configured to:
    measure or estimate the pressure and temperature of the residual burned gas in the combustion chamber when the exhaust valve is closed in the intake stroke;
    measure or estimate the pressure and temperature of the intake air which is fed into the combustion chamber after the exhaust valve is closed in the intake stroke;
    calculate the volume occupied by the residual burned gas after being changed by the supply of the intake air into the combustion chamber, by assuming that the pressure and the temperature of the residual burned gas which fills the combustion chamber volume when the exhaust valve is closed in the intake stroke become equal to the pressure and temperature of the intake air when intake air is fed to the combustion chamber, and
    determine a fuel injection amount in order to realize a desired combustion air-fuel ratio based on the calculation of volume occupied by the residual burned gas, and controlling the fuel injector to inject the fuel injection amount.
2. The internal combustion engine as set forth in claim 1, wherein
    the control unit is further configured to:
    calculate the volume of the intake air in the combustion chamber based on the calculated volume occupied by the residual burned gas; and
    calculate the volume of new gas in the intake air by multiplying the calculated volume of the intake air with a new gas ratio on the presumption that the intake air which is fed to the combustion chamber contains burned gas.

* * * * *